(12) United States Patent
Wesley et al.

(10) Patent No.: US 9,151,336 B2
(45) Date of Patent: Oct. 6, 2015

(54) POWER TAKEOFF LUBRICATION DEVICES AND METHODS

(71) Applicant: Muncie Power Products, Inc., Muncie, IN (US)

(72) Inventors: Larry Wesley, Springport, IN (US); Brian Young, Tulsa, OK (US)

(73) Assignee: MUNCIE POWER PRODUCTS, INC., Muncie, IN (US)

( * ) Notice: Subject to any disclaimer, the term of this patent is extended or adjusted under 35 U.S.C. 154(b) by 235 days.

(21) Appl. No.: 13/785,633

(22) Filed: Mar. 5, 2013

(65) Prior Publication Data

US 2013/0228411 A1    Sep. 5, 2013

Related U.S. Application Data

(60) Provisional application No. 61/606,970, filed on Mar. 5, 2012.

(51) Int. Cl.

| | |
|---|---|
| *F16D 13/74* | (2006.01) |
| *F16D 25/06* | (2006.01) |
| *B60K 17/28* | (2006.01) |
| *F16D 25/0638* | (2006.01) |
| *F16D 25/12* | (2006.01) |
| *F16D 48/02* | (2006.01) |

(52) U.S. Cl.
CPC ............... *F16D 13/74* (2013.01); *B60K 17/28* (2013.01); *F16D 25/06* (2013.01); *F16D 25/0638* (2013.01); *F16D 25/123* (2013.01); *F16D 48/02* (2013.01); *B60Y 2306/03* (2013.01); *F16D 2048/0203* (2013.01); *F16D 2048/029* (2013.01); *F16D 2048/0269* (2013.01)

(58) Field of Classification Search
CPC ......... F16D 13/72; F16D 13/74; F16D 25/06; F16D 25/065
See application file for complete search history.

(56) References Cited

U.S. PATENT DOCUMENTS

| | | | | |
|---|---|---|---|---|
| 2,833,385 | A | * | 5/1958 | Peterson et al. ............ 192/113.1 |
| 2008/0296115 | A1 | * | 12/2008 | Biles et al. ................ 192/113.34 |
| 2014/0102227 | A1 | * | 4/2014 | Mayer ............................... 74/11 |

* cited by examiner

*Primary Examiner* — Jacob S Scott
(74) *Attorney, Agent, or Firm* — Daniel L. Boots; Douglas G. Gallagher; Bingham Greenebaum Doll LLP (57) ABSTRACT

Power takeoff lubrication devices and methods are disclosed. Embodiments include an accumulator connected to a power takeoff fluid supply line and storing fluid (which may be under pressure) for selective use independent of the fluid being supplied by the fluid supply line. In some embodiments, the fluid in the accumulator is supplied to various components within the power takeoff, including the clutch plates (which may have fluid supplied prior to and/or during engagement), which can decrease wear and/or clutch temperature. In some embodiments, the fluid in the accumulator is supplied to the clutch piston to actuate the clutch piston when the pressure in the supply line is less than optimal and/or to stabilize the pressures in the hydraulic lines connected to the clutch piston. In still further embodiments, the fluid in the accumulator is supplied to the clutch when the fluid supply line pressure is less than optimal.

40 Claims, 10 Drawing Sheets

POWER TAKEOFF LUBRICATION DEVICES AND METHODS

This application claims the benefit of U.S. Provisional Application No. 61/606,970, filed Mar. 5, 2012, the entirety of which is hereby incorporated herein by reference.

FIELD

This invention relates to power takeoff (PTO) devices useful for mounting on vehicle transmissions for performing, directly or indirectly, useful work via its selectively rotatable output shaft. More particularly, this invention relates to an improved apparatus and method for lubricating the PTO device.

BACKGROUND

The use of a PTO device in association with truck or other vehicle (or stationary engine) transmissions is generally known. Such PTO devices often include an input gear, an output gear and a mechanism for engaging the input gear with the output gear so as to rotate the output shaft of the PTO device to power an auxiliary device to perform useful work when desired. The mechanism also provides a means for disengaging the input gear and the output gear.

In certain conventional designs, the input gear of the PTO device is constantly engaged with the appropriate gear in the vehicle's transmission when installed on the vehicle and is, thus, continuously turning whenever that corresponding gear in the vehicle's transmission is turning. In order to provide for selective rotation of the output shaft of the PTO device (associated with the output gear), a clutch mechanism is frequently provided between the input gear of the PTO device and that output gear. When this output shaft is rotated, useful auxiliary work can be performed. For example, the output shaft may be connected to a hydraulic pump that may be used to operate auxiliary equipment, such as garbage compacting bodies, dump bed bodies (a/k/a, "dump trucks"), garbage trucks or trailers, buckets for elevating working personnel, winches, post hole diggers, and the like.

In one conventional example the PTO device clutch is operated through an aligned multi-disc stack arrangement located between the shaft of the PTO device, and the gears of the PTO device engage their respective gears of the truck's transmission. When an axial force is applied to the disc stack, frequently by overcoming an oppositely directed biasing force typically provided by a spring, the individual discs in the stack are forced together such that the interfacial friction between the discs cause the shaft to be rotationally joined to the rotating gears.

In a typical arrangement with a PTO device connected to an engine, the circulation of cooling and lubricating fluid through the PTO device is powered by, and therefore typically controlled by, the engine transmission's circulation pump.

SUMMARY

It was realized that supply oil from the transmission to which a PTO is mounted may be limited and controlled in volume by the transmission manufacturer. In certain situations, the transmission fluid may be unavailable or inadequate when needed by the PTO, which can lead to premature wear or failure of the PTO. To help mitigate these and other situations, it was realized that additional lubrication fluid can be stored by a PTO accumulator and released upon demand using, for example, a directional valve. The release of the additional fluid can be used to prevent premature wear or potential failure of the PTO. In some embodiments, the accumulator can become replenished once the demand is over and normal operation occurs.

Embodiments of the present disclosure provide an improved Power takeoff lubrication device(s) and method(s).

In accordance with a first aspect of embodiments of the present disclosure, a PTO includes an additional fluid accumulator that may be pressurized and/or receive fluid from the transmission to which the PTO is attached. When operating the PTO with high energy requirements, fluid supplied from the transmission may be less than optimal for operating the PTO. Additional fluid can be stored in the accumulator and applied at various times (such as during clutch engagement, high temperature conditions, extended operation, etc.) using directional valves and clutch porting.

In accordance with another aspect of embodiments of the present disclosure, the additional fluid accumulator, which can be pressurized and/or receive fluid from the transmission to which the PTO is connected, provides lubrication on demand to the PTO, which may have benefits under certain PTO operating conditions, e.g., high RPM, extended running time, high operating temperatures, cold (thick) supply fluid, "dry" startup due to the mounting location, and extended idle times between normal operation and supply fluid.

In accordance with another aspect of embodiments of the present disclosure, the additional PTO fluid accumulator, which can be pressurized and/or receive fluid from the transmission to which the PTO is connected, provides a stabilized supply pressure to the PTO. Additional supply fluid stored by the accumulator and released upon demand using, for example, a directional valve to stabilize the working pressure of the fluid and maintain the pressure at an adequate level. Situations where this may be beneficial include, but are not limited to, supplying fluid shared simultaneously by the transmission and PTO with a momentary reduction in supply fluid by the transmission.

In accordance with further aspects of embodiments of the present disclosure, the additional PTO fluid accumulator is used to provide lubrication to the PTO when no fluid is available from the transmission to which the PTO is connected, such as when the engine powering the transmission (and transmission itself) and are not running. Some embodiments include a PTO output shaft connected to a pump that is adapted to power auxiliary equipment, the pump also being connected to an auxiliary power source (sometimes referred to as an auxiliary prime mover, e.g., an electric machine, engine, hydraulic motor, etc.). With the transmission off (which typically results in no fluid being supplied to the PTO from the transmission), the auxiliary prime mover can power the auxiliary pump and rotate PTO components with no lubrication being supplied, subjecting PTO components to premature wear or potential failure. However, lubrication fluid can be stored by the accumulator and released upon demand to the PTO components using, for example, a directional valve. When the engine running the transmission comes on line and the transmission becomes the source of supply lubrication again, the accumulator can be replenished once the transmission supply has reestablished an excess amount to meet all the needs.

In accordance with still other aspects of embodiments of the present disclosure, the additional PTO fluid accumulator enables PTO piston engagement prior to the supply fluid from the transmission being available, such as when the engine and transmission are off and not running. Supply fluid can be stored by the accumulator and released upon demand using, for example, a directional valve to provide pressure to the piston that engages the PTO clutch. Once the transmission is running and the fluid supply has been established to meet normal operational needs, the accumulator can be replenished.

In accordance with still further aspects of embodiments of the present disclosure, the additional PTO fluid accumulator provides PTO piston/clutch engagement and lubrication for braking. Additional lubrication fluid can be stored by the accumulator and released using, for example, a directional valve, while braking the PTO to prevent premature wear or potential failure under this condition.

In accordance with yet other aspects of embodiments of the present disclosure, the additional PTO fluid accumulator can become replenished once the demand is over and normal operation occurs.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

For the purposes of promoting an understanding of the principles of the invention, reference will now be made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Depicted in FIGS. 1 through 4 is a power takeoff device (for example, PTO 100) according to one embodiment of the present invention. PTO 100 includes a transmission mount 110 for mounting PTO 100 to a transmission (not shown), a transmission engagement gear 112 (see FIG. 2) for operatively connecting PTO 100 to the transmission, and an output shaft 102 (see FIG. 4) for operatively connecting PTO 100 to auxiliary equipment (also not shown). PTO 100 further includes a PTO clutch pack 104 for selectively engaging and/or disengaging the transmission engagement gear 112 and the output shaft 102.

Figure 6:
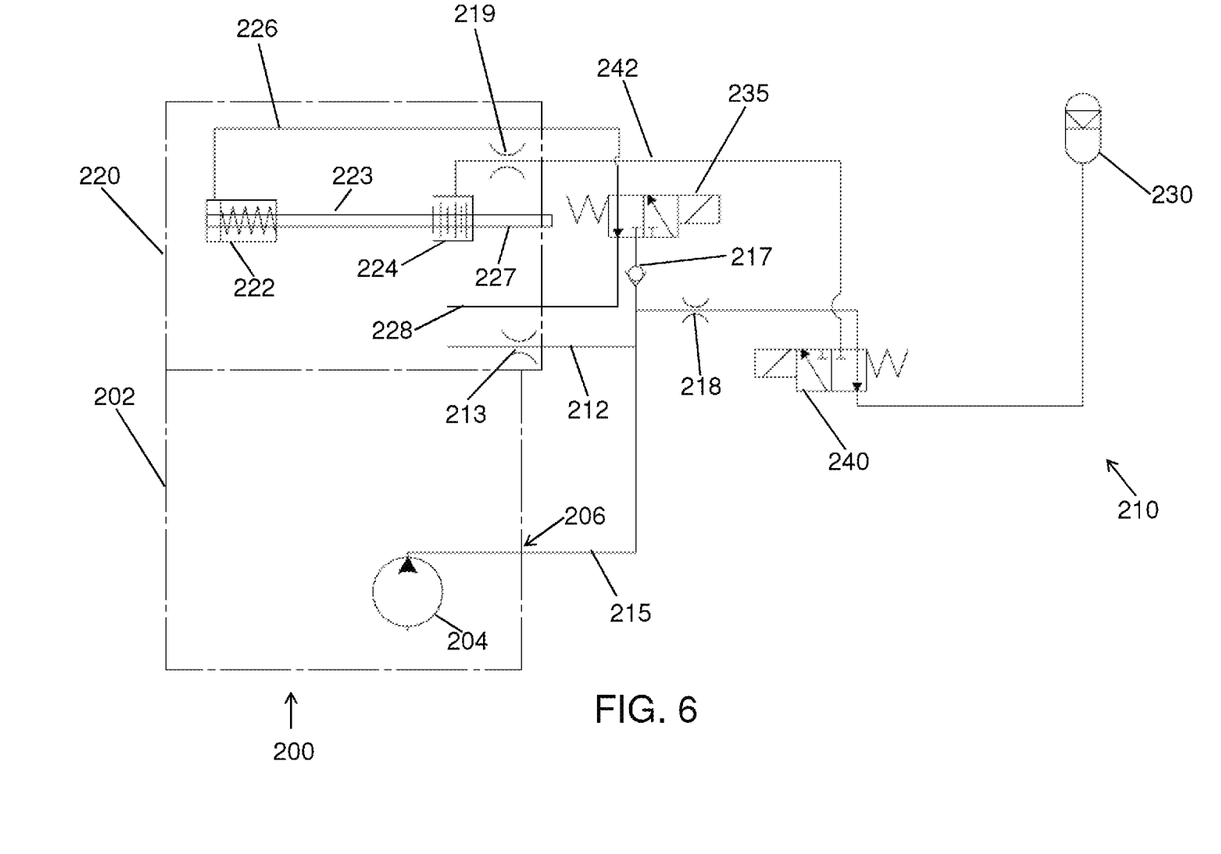
FIG. 6 is a schematic representation of a PTO coolant and/or lubrication system according to one embodiment of the present disclosure.

PTO 100 further includes a clutch engagement control port 120 (which may be referred to in some embodiments as a pressure switch port), which is connectable to a control solenoid/valve (such as a valve similar to PTO engagement/disengagement directional valve 235 in FIG. 6) which allows selective connection of the transmission's fluid supply (which is frequently pressurized) to the piston actuating the PTO clutch for selectively engaging and disengaging PTO clutch pack 104. Port 120 is in fluid communication with a clutch engagement control passageway 122 (which is similar to piston engagement/disengagement line 226 in FIG. 6).

In use, an operator can selectively engage and disengage PTO clutch pack 104 by controlling the hydraulic fluid pressure within clutch engagement control passageway 122, thereby selectively engaging and disengaging output shaft 102 and engine engagement gear 112. As an example, an operator may actuate a remotely oriented solenoid connected to clutch engagement control port 120 to vary and control the hydraulic fluid pressure within clutch engagement control port 120, thereby controlling the hydraulic fluid pressure within clutch engagement control passageway 122 and controlling the engagement and disengagement of PTO clutch pack 104 (e.g., passageway 122 may receive clutch pressure from the solenoid).

A cooling and/or lubrication fluid accumulator port is also included in various embodiments. For example, PTO 100 includes cooling and/or lubrication fluid accumulator port 130 (which may be referred to in some embodiments as an accumulator circuit port), which is connectible to a supply of cooling and/or lubricating fluid, for example a fluid accumulator and the transmission's fluid supply. Port 130 can receive a directional valve (such as a valve similar to accumulator charge/discharge directional valve 240 depicted in FIG. 6), which allows selective connection of the accumulator to a fluid passageway in the PTO (e.g., a passageway for receiving clutch lubrication from the accumulator and/or a coolant passageway, such as clutch coolant passageway 132), which is in fluid communication with one or more locations within PTO 100 that require cooling and/or lubrication) and to the transmission's fluid supply.

When the cooling and/or lubrication fluid accumulator port 130 is connected to an transmission fluid reservoir, lubrication fluid can be directed to flow into clutch lubrication passageway 132 and/or directed to charge the fluid accumulator, such as during periods when the transmission fluid is not required in the transmission. When the PTO is not engaged, fluid from the transmission charges the accumulator by passing through, for example, a multi-port valve (such as a valve similar to accumulator charge/discharge directional valve 240 depicted in FIG. 6). The build up of lubrication fluid is then available for on-demand use in PTO 100, even during times when the transmission fluid circulation pump is not circulating transmission fluid through either the engine or PTO 100. In this way, PTO 100 is able to take advantage of the hydraulic fluid stored in the fluid accumulator, which may be under pressure, to inject the lubrication fluid on demand into the PTO device or other desired locations or devices, such as the gearbox, extended shaft, or related product.

Figure 1:
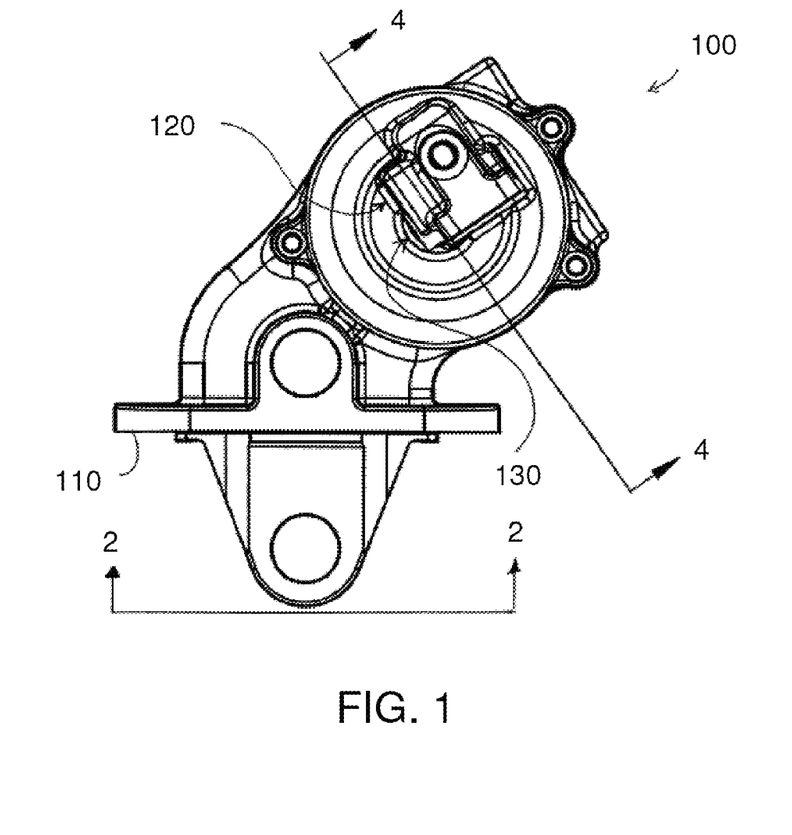
FIG. 1 is a front elevational view of a PTO device according to one embodiment of the present invention.
Figure 2:
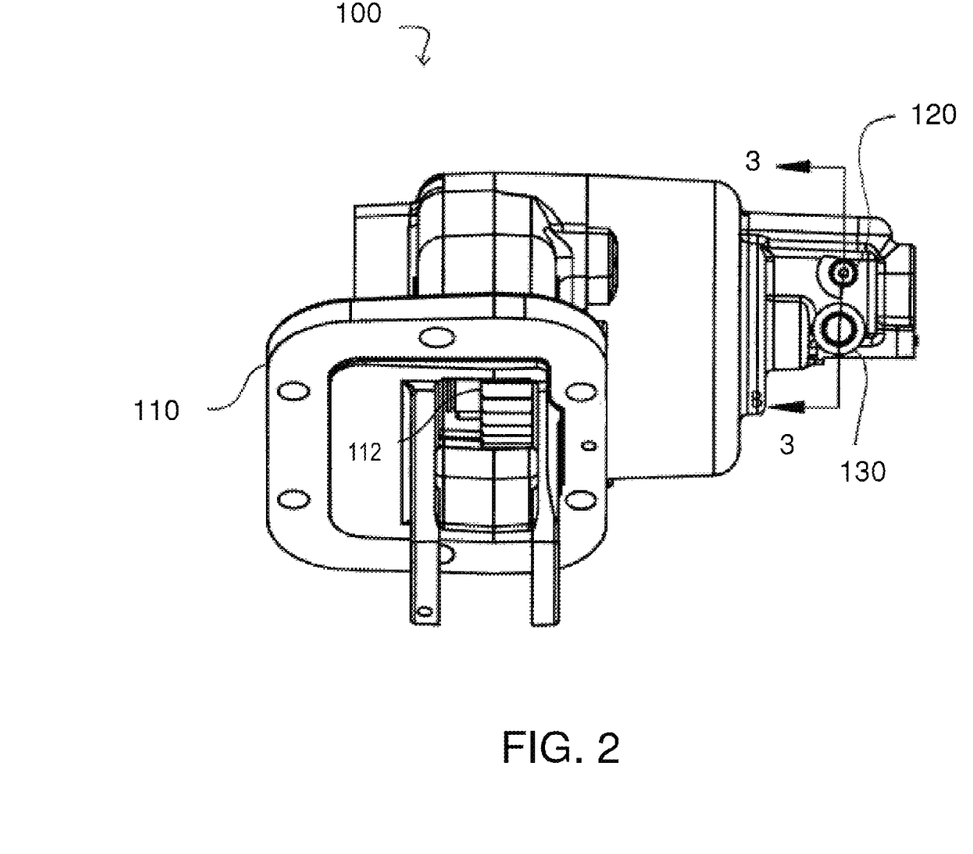
FIG. 2 is a side elevational view of the PTO device depicted in FIG. 1 as viewed along line 2-2.
Figure 3:
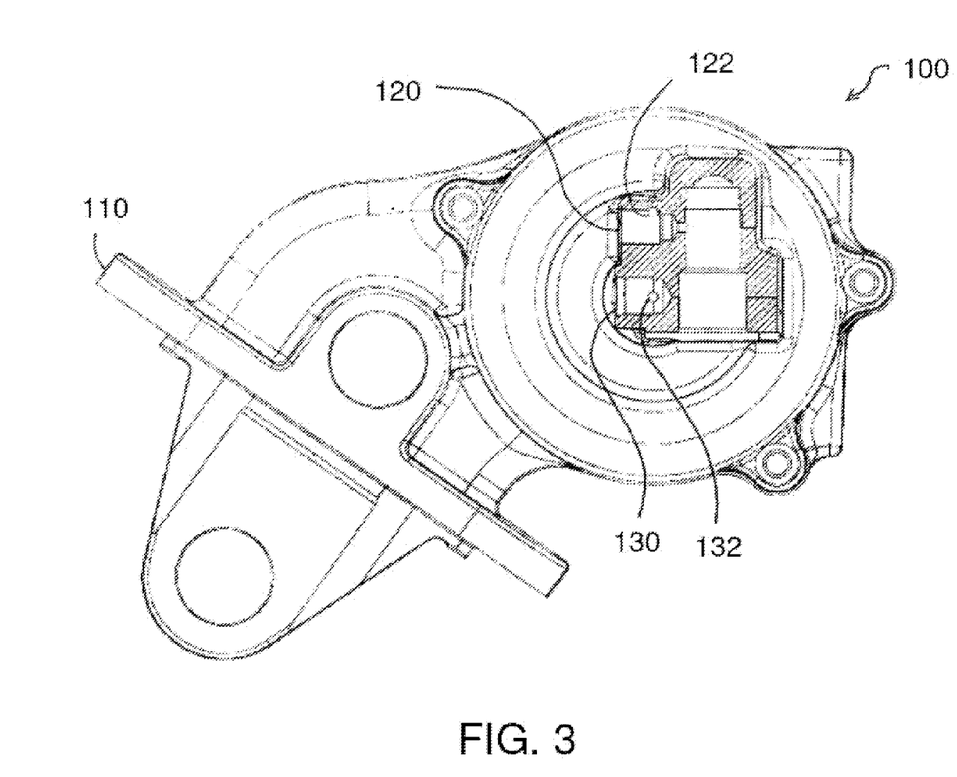
FIG. 3 is a sectional view of the PTO device depicted in FIG. 2 as viewed along line 3-3.
Figure 4:
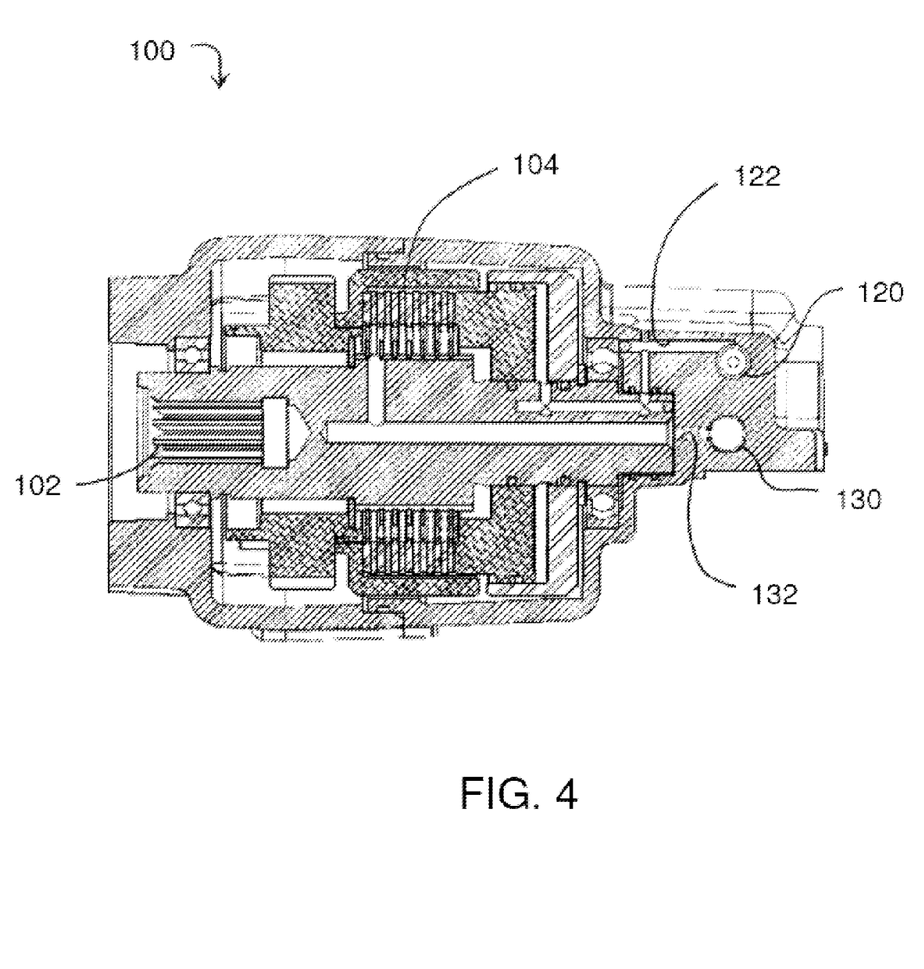
FIG. 4 is a sectional view of the PTO device depicted in FIG. 1 taken along line 4-4.
Figure 5:
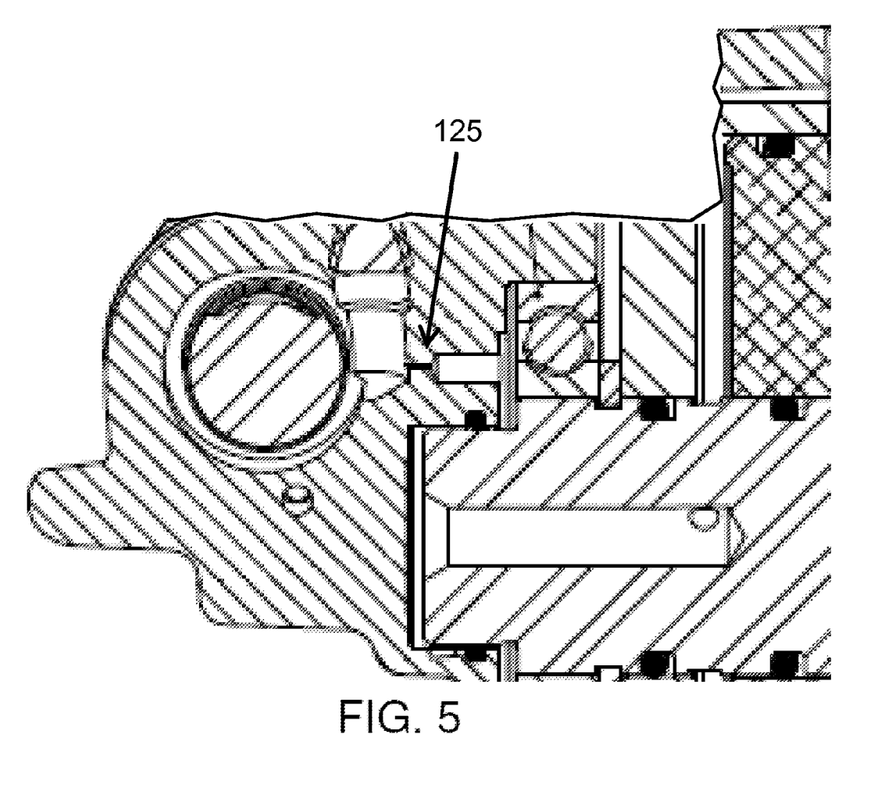
FIG. 5 is a sectional view depicting a lubrication port according to one embodiment of the present invention.

During times when the transmission lubrication pump is circulating fluid, lubrication fluid can still flow normally through the transmission and the power takeoff. When operating with the clutch engaged or disengaged, fluid can flow through, for example, a lubrication port (e.g., port 125, which can be a lubrication port when the engine is operating with or without PTO engagement) as depicted in the embodiment represented by FIG. 5.

In various embodiments, fluid is stored and released when needed, for example, to cool or lubricate a power takeoff or gearbox. In one example embodiment, when the PTO clutch is engaged a multi-port valve can release fluid from the accumulator and lubricate and/or cool the clutch.

Depicted in FIG. 6 is a schematic representation of a PTO lubrication system 210 connected to a transmission 200 according to one embodiment of the present invention. Transmission 200 includes a transmission housing 202, a hydraulic pump 204, and an access port 206 to which system 210 may connect. System 210 further includes a PTO housing 220, which encloses a piston 222 and a clutch 224. An accumulator 230, a PTO engagement/disengagement directional valve 235 and an accumulator charge/discharge directional valve 240 are also included. Although accumulator 230 and directional valves 235 and 240 are depicted as being external to PTO housing 220, embodiments of the present disclosure include accumulator 230 and directional valves 235 and 240 within PTO housing 220.

System 210 is connected to transmission access port 206 by a transmission supply line, for example, transmission supply line 215. Although fluid passageways may be referred to as "lines," it should be appreciated that this terminology is non-limiting and other types of passageways that direct fluid (which include passageways between components (e.g., metal PTO components), passageways through components, flexible passageways, rigid passageways, hydraulic lines, and hydraulic hoses) are contemplated.

Accumulator charge/discharge directional valve 240 is connected to accumulator 230, transmission supply line 215, and clutch coolant line 242. Clutch coolant line 242 is connected to clutch 224 and is capable of supplying fluid to clutch 224. In some embodiments, coolant line 242 is connected to a housing at least partially surrounding clutch 224. PTO engagement/disengagement directional valve 235 is connected to piston engagement/disengagement line 226 and transmission supply line 215. PTO engagement/disengagement directional valve 235 is optionally connected to PTO piston drain line 228.

System 210 optionally includes a PTO lubricant/coolant line 212 to provide fluid to components (such as bearings) in the PTO housing. In one embodiment, the bearings are located in a portion (such as an upper portion) of the PTO housing 220 and PTO lubricant/cooling line 212 supplies fluid through an optional orifice 213 to within PTO housing 220 to lubricate (such as by splashing) the bearings in PTO housing 220. The orifice can assist in limiting the rate at which a fluid flows through the passageway containing the orifice.

Piston 222 is connected to one side of clutch pack 224, such as by a physical connection 223, so that movement of piston 222 causes engagement (or disengagement) of clutch 224 and rotation (or nonrotation) of PTO output shaft 227.

In use, supply line 215 of system 210 is connected to access port 206 of transmission 200. When transmission pump 204 is energized, transmission supply line 215 is pressurized. If included, PTO lubricant/coolant line 212 will be pressurized and supply fluid to within PTO housing 220, such as to supply fluid to the bearings within PTO housing 220.

With PTO engagement/disengagement directional valve 235 in the position/orientation depicted in FIG. 6, piston engagement/disengagement line 226 is isolated from the pressurized fluid in the transmission supply line 215, and the piston engagement/disengagement line 226 is connected to PTO piston drain line 228.

With transmission supply line 215 pressurized, accumulator 230 will pressurize and fill with fluid (provided accumulator 230 is not already full of fluid) while accumulator charge/discharge directional valve 240 is in the position/orientation depicted in FIG. 6.

When the operator desires to engage the PTO, PTO engagement/disengagement directional valve 235 is actuated connecting transmission supply line 215 and piston engagement line 226. With transmission supply line 215 pressurized, piston engagement line 226 and piston 222 pressurize, which engages clutch 224. It should be appreciated that, in some embodiments, one side of clutch 224 is rotationally connected to transmission 200 so that the one side of clutch 224 rotates while transmission 200 rotates. Once clutch 224 is engaged, PTO output shaft 227 will rotate. While piston engagement/disengagement line 226 is connected to and pressurized by transmission supply line 215, PTO engagement/disengagement directional valve 235 will isolate PTO piston drain line 228 from piston engagement line 226.

In situations where clutch 224 requires additional fluid, accumulator charge/discharge directional valve 240 may be actuated to connect accumulator 230 to clutch coolant line 242 and supply additional lubrication and/or cooling fluid to clutch 224.

As depicted in FIG. 6, when accumulator charge/discharge directional valve 240 is positioned to connect accumulator 230 and clutch coolant line 242, accumulator 230 is isolated from supply line 215. By closing the connection between clutch coolant line 242 and accumulator 230, pressure in supply line 215 and piston engagement line 226 is maintained and clutch 224 remains firmly engagement.

When pressure within supply line 215 is sufficiently high to facilitate charging of accumulator 230, directional valve 240 may be positioned to connect supply line 215 and accumulator 230, thereby supplying pressurized fluid to and charging accumulator 230. The fluid within accumulator 230 is then available when needed to supply additional lubrication and/or cooling to clutch 224.

In certain embodiments, valve 240 is positioned to connect accumulator 230 to clutch coolant line 242 before and/or during engagement of clutch 224. For example, when the operator initiates engagement of clutch 224 (such as by moving a lever or a switch), system 210 actuates directional valve 240 to connect accumulator 230 and clutch coolant line 242 before directional valve 235 is actuated to connect supply line 215 and piston engagement/disengagement line 226. In other example embodiments, the actuation of directional valve 240 to connect accumulator 230 and clutch coolant line 242 is simultaneous with or slightly after engagement of directional valve 235 to connect supply line 215 and piston engagement/disengagement line 226 so that fluid from accumulator 230 is supplied to clutch 224 while clutch 224 is engaging.

The supply of additional fluid from accumulator 230 to clutch 224 during (and prior to) engagement of the plates in clutch 224 provides lubrication/coolant to the plates in clutch 224 reducing friction (and heat caused by the friction) between the individual clutch plates as clutch 224 engages. The additional fluid in the clutch 224 can also help absorb heat generated as the plates in clutch 224 engage with one another, helping to control the buildup of excess temperature within clutch 224.

In some embodiments clutch 224 is configured to allow fluid from clutch coolant line 242 to drain through clutch 224, and the flow of fluid from clutch coolant line 242 through clutch 224 further helps remove heat from clutch 224 mitigating the buildup of excessive heat within clutch 224, either while clutch 224 is engaging or after clutch 224 is fully engaged.

In some embodiments, the passageway connecting accumulator charge/discharge directional valve 240 to supply line 215 may include an orifice (e.g. orifice 218) and/or a check valve. The optional orifice in this location can assist in limiting the rate at which a fluid is drawn from transmission supply line 215. The optional check valve can assist in maintaining pressure within accumulator 230 when pressure in supply line 215 decreases.

An optional check valve (e.g., check valve 217) may also be included on fluid supply line 215.

To disengage clutch 224, directional valve 235 is repositioned to the orientation depicted in FIG. 6, which shuts off the flow of hydraulic fluid from transmission supply line 215 to piston engagement line 226. In some embodiments, this orientation of directional valve 235 also connects piston engagement line 226 to piston drain line 228, which allows excess of fluid in piston 222 to drain from piston 222 thereby removing hydraulic resistance within piston 222 to the disengagement of clutch 224.

In situations where the removal of fluid and/or pressure from transmission supply line 215 may disrupt PTO operation (such as during high demand operations when output shaft 227 is subject to high loads), accumulator charge/discharge directional valve 240 may be positioned to inhibit fluid flowing from transmission supply line 215 into accumulator 230.

Additional fluid may be manually supplied to the PTO based on operator commands or may be automatically supplied to the PTO based on a variety of parameters, such as PTO component temperature, fluid temperature, rotational rate, and/or fluid viscosity.

In some embodiments, the capacity of accumulator 230 is at least one-tenth (1/10) of a liter and at most approximately five (5) liters, while in still other embodiments the capacity of accumulator 230 is approximately one (1) liter.

In some embodiments, supply line 215 may be connected directly to clutch coolant line 242 (bypassing the need for an accumulator) and the flow of hydraulic fluid from transmission supply line 215 to clutch 224 may be controlled by an orifice (such as orifice 219), a check valve, and/or some other form of variable and/or device to control the flow of hydraulic fluid to clutch 224.

Figure 7:
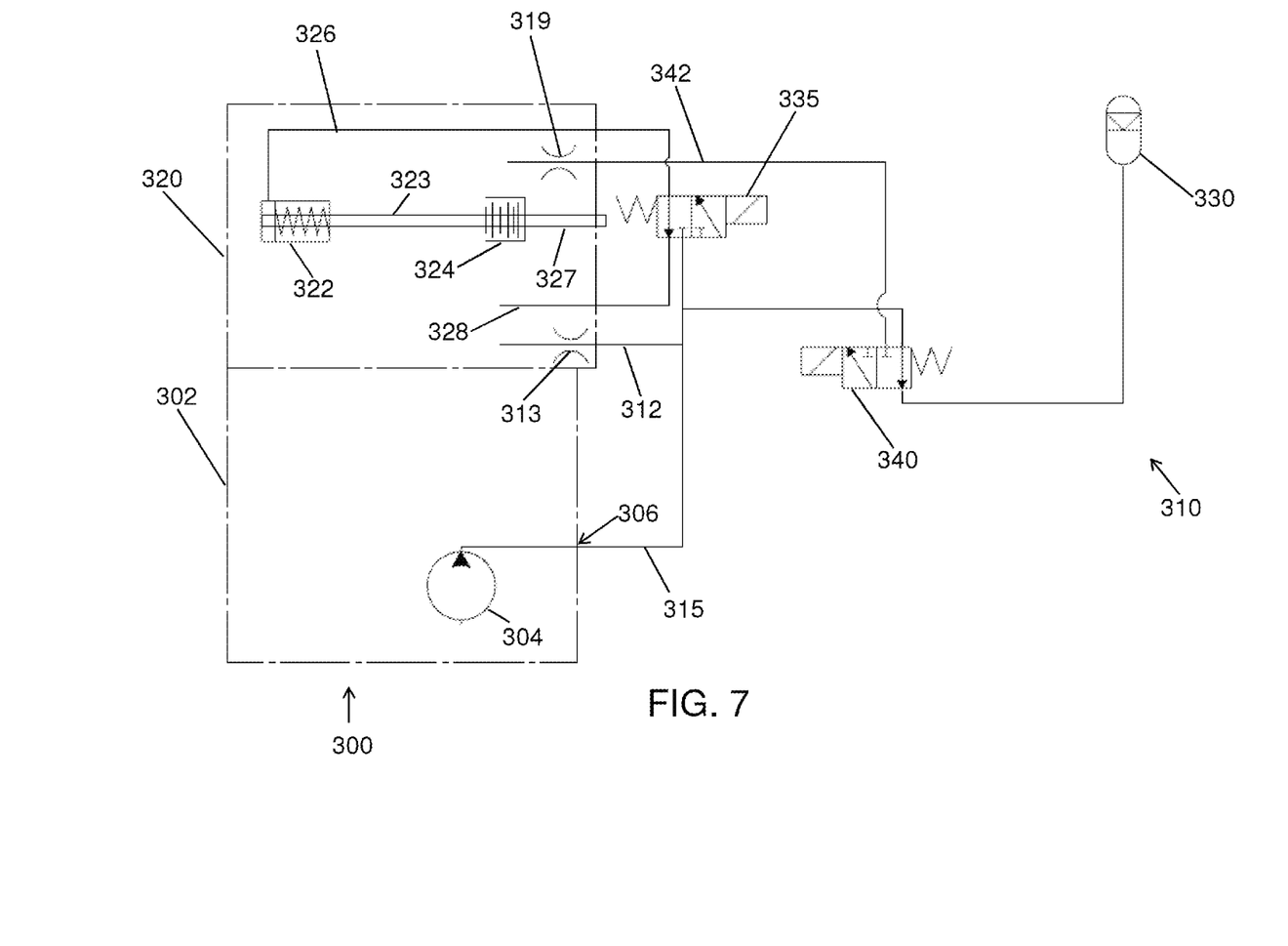
FIG. 7 is a schematic representation of another PTO coolant and/or lubrication system according to another embodiment of the present invention.

Depicted in FIG. 7 is a system 310 according to another embodiment of the present disclosure. Transmission 300 and system 310 are similar to transmission 200 and system 210 with similar reference numerals representing similar structure(s) and/or function(s). In system 310, hydraulic passageway 342 is not directly connected to clutch 324. Instead, hydraulic passageway terminates at some point within PTO housing 322 to supply additional hydraulic/lubrication/cooling fluid to portions of the PTO (which may include clutch 324 and/or other portions of the PTO) that may require additional hydraulic/lubrication/cooling fluid. Similar to system 210, additional fluid may be manually supplied to the PTO based on operator commands or may be automatically supplied to the PTO based on a variety of parameters, such as PTO component temperature, fluid temperature, rotational rate, and/or fluid viscosity.

Figure 8:
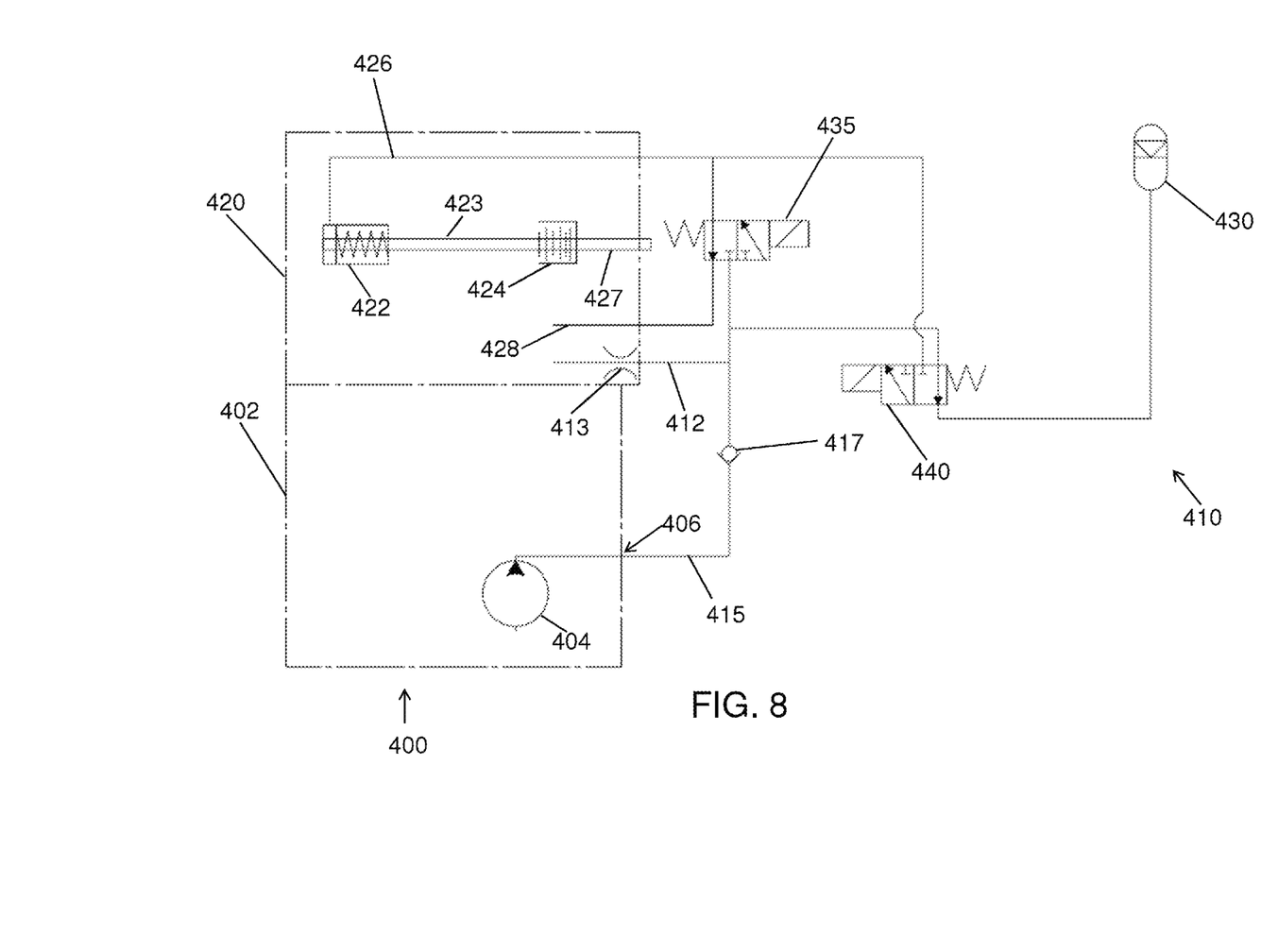
FIG. 8 is a schematic representation of another PTO coolant and/or lubrication system according to still another embodiment of the present invention.

Depicted in FIG. 8 is a system 410 according to another embodiment of the present disclosure. Transmission 400 and system 410 are similar to transmissions 200 and 300, and systems 210 and 310 with similar reference numerals representing similar structure(s) and/or function(s). In system 410, accumulator 430 discharges to piston engagement line 426 when the accumulator charge/discharge directional valve 440 is in the discharge orientation—positioned to connect accumulator 430 and piston engagement line 426. (Note that as depicted in FIG. 8, the accumulator charge/discharge directional valve 440 is in the charging orientation connecting accumulator 430 to transmission supply line 415). System of 410 also includes an optional check valve 417 in transmission supply line 415. In FIG. 8, check valve 417 is depicted as being located between access port 406 and the point where PTO lubricant/coolant line 412 connects to supply line 415; however, in alternate embodiments check valve 417 is located between the point where PTO lubricant/coolant line 412 connects to supply line 415 and PTO engagement/disengagement directional valve 435.

In use, system 410 can maintain a stabilized working pressure in piston engagement line 426 and piston 422, such as in situations where transmission pump 404 has decreased output (e.g., decreased pressure). As an example, if the engine powering transmission 400 frequently changes speed (such as when the PTO is connected to a snow plow, the PTO powering snowplowing or salt spreading equipment while the snowplow moves down a roadway shifting gears and varying the speed of its main engine) and causes variation in the output of pump 404, the pressure within piston engagement line 426 and piston 422 can vary, which may have detrimental effects during periods when PTO output shaft 427 is subject to high loads. System 410 can use the fluid and/or pressure within accumulator 430 to maintain proper pressure within piston 422 (such as by positioning directional valve 440 to connect accumulator 420 and piston engagement line 426) and prevent slippage within clutch 424 even when PTO output shaft 427 is experiencing high loads.

Figure 9:
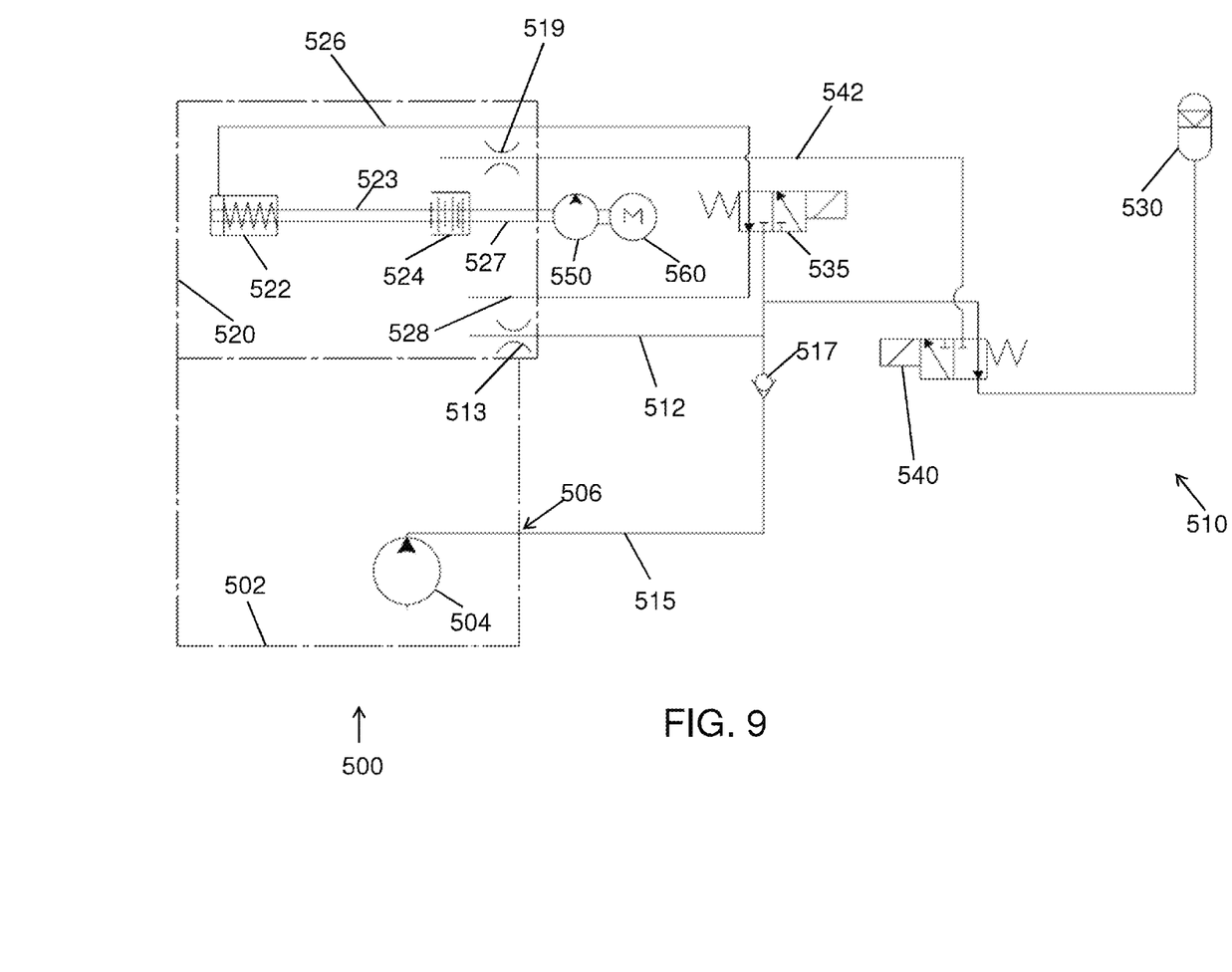
FIG. 9 is a schematic representation of another PTO coolant and/or lubrication system according to yet a further embodiment of the present invention.

Depicted in FIG. 9 is a system 510 according to still another embodiment of the present disclosure. Transmission 500 and system 510 are similar to transmissions 200, 300 and 400, and systems 210, 310 and 410 with similar reference numerals representing similar structure(s) and/or function(s). As with other embodiments, clutch 524 is connected to piston 522. Clutch 524 is further connected to a hydraulic pump 550, and hydraulic pump 550 is further connected to an alternative power source 560 (sometimes referred to as an alternate prime mover). Hydraulic pump 550 may be connected to and power various types of auxiliary machinery that may be used on or with the engine connected to transmission 500. Although described as a hydraulic pump, pump 550 may also be another type of pump that can power auxiliary equipment, such as a pneumatic pump. Moreover, although hydraulic pump 550 and alternative power source 560 are depicted as being external to PTO housing 520, embodiments of the present disclosure include hydraulic pump 550 and alternative power source 560 within PTO housing 520.

An optional check valve 517 may be installed (such as on supply line 515) to prevent fluid from accumulator 530 flowing into transmission housing 502, especially during periods when transmission 500 is not operating. In FIG. 9, check valve 517 is depicted as being located between access port 506 and the point where PTO lubricant/coolant line 512 connects to supply line 515; however, in alternate embodiments check valve 517 is located between the point where PTO lubricant/coolant line 512 connects to supply line 515 and PTO engagement/disengagement directional valve 535, and in some embodiments between the point where PTO lubricant/coolant line 512 connects to supply line 515 and the point where accumulator charge/discharge directional valve 540 connects to supply line 515.

Alternative power source 560 may be an electric motor, a gas engine, a diesel engine, a liquid propane engine, or another type of power source capable of actuating hydraulic pump 550. One advantage realized by having hydraulic pump 550 powered by PTO output shaft 527 and/or electric motor 560 is the ability to power hydraulic pump 550 using alternative power source 560 while the engine powering transmission 500 is off (or is at low power). It should be appreciated that while the engine powering transmission 500 is off (or is at low power), PTO output shaft 527 is incapable of (or at least has a diminished capacity for) powering pump 550.

Operating hydraulic pump 550 while the engine powering transmission 500 is off (or is at low power) may have advantages in situations where running the engine that powers transmission 500 (which is typically the main engine for propelling the vehicle) is less efficient than operating the alternative power source 560, which may occur in situations where the vehicle to which transmission 500 is attached is not moving. Since alternative power source 560 is not required to move the vehicle to which transmission 500 is connected, alternative power source 560 may be smaller and more efficient than the main drive motor for the vehicle.

In system 510, hydraulic passageway 542 is not directly connected to clutch 524, but instead terminates at some point within PTO housing 522 generally supplying additional hydraulic/lubrication fluid to portions of the PTO (which may include clutch 524, hydraulic pump 550, alternative power source 560, and/or other portions of the PTO) that may require additional hydraulic/lubrication fluid. However, alternate embodiments include a direct connection between hydraulic passageway 542 and clutch 524. Similar to other embodiments, additional fluid may be manually supplied to the PTO based on operator commands or may be automatically supplied to the PTO based on a variety of parameters, such as PTO component temperature, fluid temperature, rotational rate, and/or fluid viscosity.

Figure 10:
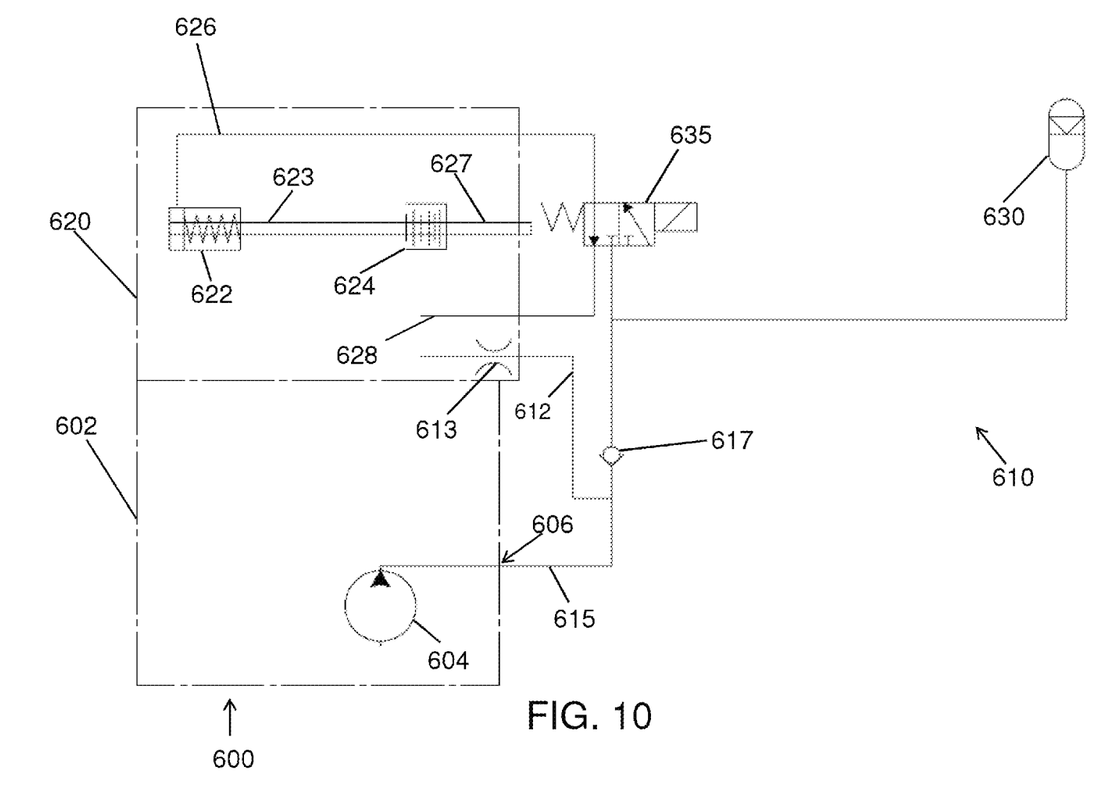
FIG. 10 is a schematic representation of another PTO coolant and/or lubrication system according to another embodiment of the present invention.

Depicted in FIG. 10 is a system 510 according to yet a further embodiment of the present disclosure. Transmission 600 and system 610 are similar to transmissions 200, 300, 400 and 500, and systems 210, 310, 410 and 510, with similar reference numerals representing similar structures and/or functions. In system 610, accumulator 630 is connected directly to supply line 615 and supply line 615 includes a check valve 617. In use, accumulator 630 may be used to pressurize piston engagement/disengagement line 626 and actuate piston 622 to engage clutch 624 before starting the engine that powers transmission 600. Similar to system 410, accumulator 630 may also be used to stabilize hydraulic pressure within the PTO.

Various Aspects of Different Embodiments of the Present Disclosure are Expressed in Paragraphs X1, X2, and X3, as Follows:

X1. One embodiment of the present disclosure includes a power takeoff with a fluid supply line, the fluid supply line configured and adapted to connect to a transmission and supply fluid for operation of the power takeoff; and a hydraulic accumulator connected to the fluid supply line and to the power takeoff; wherein the hydraulic accumulator is configured and adapted to retain fluid; and wherein the hydraulic accumulator is configured and adapted to supply fluid retained in the hydraulic accumulator to the power takeoff.

X2. Another embodiment of the present disclosure includes supplying pressurized fluid in a fluid supply line to a power takeoff; retaining fluid in a hydraulic accumulator connected to the fluid supply line and to the power takeoff; and augmenting the supply of fluid in the fluid supply line to the power takeoff with the fluid retained in the hydraulic accumulator.

X3. Still another embodiment of the present disclosure includes a power takeoff with a fluid supply line, the fluid supply line configured and adapted to connect to a transmission and supply fluid for operation of the power takeoff; and means for storing fluid and augmenting the supply of fluid to the power takeoff by the fluid supply line.

Yet Other Embodiments Include the Features Described in any of the Previous Statements X1, X2 or X3, as Combined with One or More of the Following Aspects:

Wherein the hydraulic accumulator is configured and adapted to retain fluid independent of pressure fluctuations in the fluid supply line; and wherein the hydraulic accumulator is configured and adapted to supply fluid retained in the hydraulic accumulator to the power takeoff independent of pressure fluctuations in the fluid supply line.

Wherein the power takeoff includes clutch plates, and wherein the hydraulic accumulator supplies fluid to the clutch plates.

Wherein the hydraulic accumulator supplies fluid to the clutch plates while the clutch plates are being engaged to rotate an output shaft.

Wherein the hydraulic accumulator supplies fluid to the clutch plates when a temperature in the power takeoff exceeds a threshold.

Wherein the power takeoff comprises a clutch piston, wherein the fluid supply line is connected to the clutch piston and supplies fluid to actuate the clutch piston to engage a clutch, and wherein the fluid accumulator is configured and adapted to retain fluid at a pressure above the pressure in the fluid supply line when the pressure in the fluid supply line is less than normal operating pressure for actuating the clutch piston.

Wherein the hydraulic accumulator supplies fluid to the clutch piston.

Wherein the hydraulic accumulator supplies fluid to the clutch piston to engage the clutch when the fluid supplied by the transmission is insufficient to engage the clutch.

Wherein the hydraulic accumulator stabilizes the hydraulic pressure in the clutch piston.

Wherein the power takeoff comprises a directional valve connected to the fluid supply line, the hydraulic accumulator, and the power takeoff, wherein the directional valve selectively connects the accumulator to the fluid supply line or to the power takeoff.

Wherein the hydraulic accumulator is pressurized by fluid from the supply line.

Wherein the power takeoff and/or method comprises pressurizing a piston connected to a clutch in the power takeoff with fluid retained in the hydraulic accumulator; and engaging the clutch by said pressurizing.

Wherein the power takeoff and/or method comprises pressurizing the accumulator with fluid from the fluid supply line.

Wherein the power takeoff and/or method comprises supplying fluid retained in the hydraulic accumulator to the power takeoff independent of the fluid pressure in the supply line.

Wherein the power takeoff and/or method comprises supplying fluid retained in the hydraulic accumulator to the surface of clutch plates in the power takeoff, the clutch plates being connected to an output shaft of the power takeoff.

Wherein said supplying occurs while the clutch plates are being engaged with one another to actuate the output shaft.

Wherein said supplying occurs when a temperature in the power takeoff exceeds a threshold.

Wherein the power takeoff and/or method comprises maintaining the pressure of the retained fluid above the pressure in the fluid supply line when the pressure in the fluid supply line is less than normal operating pressure for actuating the clutch piston.

Wherein the power takeoff and/or method comprises stabilizing the hydraulic pressure in the clutch piston with the fluid retained in the hydraulic accumulator.

Wherein the power takeoff and/or method comprises selectively connecting the supply line to a piston connected to a clutch in the power takeoff; and selectively connecting the accumulator to the supply line or the clutch.

Wherein said selectively connecting the accumulator connects the accumulator to a clutch piston when said selectively connecting the accumulator results in connecting the accumulator to the clutch.

Wherein said selectively connecting the accumulator connects the accumulator to a location where fluid from the accumulator will reach the surface of clutch plates when said selectively connecting the accumulator results in connecting the accumulator to the clutch.

Reference systems that may be used herein can refer generally to various directions (e.g., upper, lower, forward and rearward), which are merely offered to assist the reader in understanding the various embodiments of the disclosure and are not to be interpreted as limiting. Other reference systems may be used to describe various embodiments, such as referring to the direction of projectile movement as it exits the firearm as being up, down, rearward or any other direction.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. One or more exemplary embodiments have been shown and described, and all changes and modifications that come within the spirit of the disclosure are desired to be protected.

What is claimed is:

1. An apparatus, comprising:
   a power takeoff with a fluid supply line, the fluid supply line configured and adapted to connect to a transmission and supply fluid for operation of the power takeoff;
   a hydraulic accumulator connected to the fluid supply line and to the power takeoff; and
   a clutch piston;
   wherein the fluid supply line is connected to the clutch piston and supplies fluid to actuate the clutch piston to engage a clutch;
   wherein the hydraulic accumulator is configured and adapted to retain fluid independent of pressure fluctuations in the fluid supply line;
   wherein the hydraulic accumulator is configured and adapted to supply fluid retained in the hydraulic accumulator to the power takeoff independent of pressure fluctuations in the fluid supply line; and
   wherein the hydraulic accumulator is configured and adapted to retain fluid at a pressure above the pressure in the fluid supply line when the pressure in the fluid supply line is less than normal operating pressure for actuating the clutch piston.

2. The apparatus of claim 1, wherein the power takeoff includes clutch plates, and wherein the hydraulic accumulator supplies fluid to the clutch plates.

3. The apparatus of claim 2, wherein the hydraulic accumulator supplies fluid to the clutch plates while the clutch plates are being engaged to rotate an output shaft.

4. The apparatus of claim 2, wherein the hydraulic accumulator supplies fluid to the clutch plates when a temperature in the power takeoff exceeds a threshold.

5. The apparatus of claim 1, wherein the hydraulic accumulator supplies fluid to the clutch piston.

6. The apparatus of claim 5, wherein the hydraulic accumulator supplies fluid to the clutch piston to engage the clutch when the fluid supplied by the transmission is insufficient to engage the clutch.

7. The apparatus of claim 5, wherein the hydraulic accumulator stabilizes the hydraulic pressure in the clutch piston.

8. The apparatus of claim 1, comprising:
   a directional valve connected to the fluid supply line, the hydraulic accumulator, and the power takeoff, wherein the directional valve selectively connects the accumulator to the fluid supply line or to the power takeoff.

9. The apparatus of claim 1, wherein the hydraulic accumulator is pressurized by fluid from the supply line.

10. A method, comprising:
supplying pressurized fluid in a fluid supply line to a power takeoff;
retaining fluid in a hydraulic accumulator connected to the fluid supply line and to the power takeoff;
augmenting the supply of fluid in the fluid supply line to the power takeoff with the fluid retained in the hydraulic accumulator; and
supplying fluid retained in the hydraulic accumulator to the power takeoff independent of the fluid pressure in the supply line.

11. The method of claim 10, comprising:
pressurizing a piston connected to a clutch in the power takeoff with fluid retained in the hydraulic accumulator; and
engaging the clutch by said pressurizing.

12. The method of claim 10, comprising:
pressurizing the accumulator with fluid from the fluid supply line.

13. The method of claim 10, comprising:
supplying fluid retained in the hydraulic accumulator to the surface of clutch plates in the power takeoff, the clutch plates being connected to an output shaft of the power takeoff.

14. The method of claim 13, wherein said supplying occurs while the clutch plates are being engaged with one another to actuate the output shaft.

15. The method of claim 13, wherein said supplying occurs when a temperature in the power takeoff exceeds a threshold.

16. The method of claim 10, comprising:
maintaining the pressure of the retained fluid above the pressure in the fluid supply line when the pressure in the fluid supply line is less than normal operating pressure for actuating the clutch piston.

17. The method of claim 10, comprising:
stabilizing the hydraulic pressure in the clutch piston with the fluid retained in the hydraulic accumulator.

18. The method of claim 10, comprising:
selectively connecting the supply line to a piston connected to a clutch in the power takeoff; and
selectively connecting the accumulator to the supply line or the clutch.

19. The method of claim 18, wherein said selectively connecting the accumulator connects the accumulator to a clutch piston when said selectively connecting the accumulator results in connecting the accumulator to the clutch.

20. The method of claim 18, wherein said selectively connecting the accumulator connects the accumulator to a location where fluid from the accumulator will reach the surface of clutch plates when said selectively connecting the accumulator results in connecting the accumulator to the clutch.

21. An apparatus, comprising:
a power takeoff with a fluid supply line, the fluid supply line configured and adapted to connect to a transmission and supply fluid for operation of the power takeoff;
a hydraulic accumulator connected to the fluid supply line and to the power takeoff; and
a directional valve connected to the fluid supply line, the hydraulic accumulator, and the power takeoff, wherein the directional valve selectively connects the accumulator to the fluid supply line or to the power takeoff;
wherein the hydraulic accumulator is configured and adapted to retain fluid independent of pressure fluctuations in the fluid supply line; and
wherein the hydraulic accumulator is configured and adapted to supply fluid retained in the hydraulic accumulator to the power takeoff independent of pressure fluctuations in the fluid supply line.

22. The apparatus of claim 21, wherein the power takeoff includes clutch plates, and wherein the hydraulic accumulator supplies fluid to the clutch plates.

23. The apparatus of claim 22, wherein the hydraulic accumulator supplies fluid to the clutch plates while the clutch plates are being engaged to rotate an output shaft.

24. The apparatus of claim 22, wherein the hydraulic accumulator supplies fluid to the clutch plates when a temperature in the power takeoff exceeds a threshold.

25. The apparatus of claim 21 comprising:
a clutch piston, wherein the fluid supply line is connected to the clutch piston and supplies fluid to actuate the clutch piston to engage a clutch, and wherein the fluid accumulator is configured and adapted to retain fluid at a pressure above the pressure in the fluid supply line when the pressure in the fluid supply line is less than normal operating pressure for actuating the clutch piston.

26. The apparatus of claim 25, wherein the hydraulic accumulator supplies fluid to the clutch piston.

27. The apparatus of claim 26, wherein the hydraulic accumulator supplies fluid to the clutch piston to engage the clutch when the fluid supplied by the transmission is insufficient to engage the clutch.

28. The apparatus of claim 26, wherein the hydraulic accumulator stabilizes the hydraulic pressure in the clutch piston.

29. The apparatus of claim 21, wherein the hydraulic accumulator is pressurized by fluid from the supply line.

30. A method, comprising:
supplying pressurized fluid in a fluid supply line to a power takeoff;
retaining fluid in a hydraulic accumulator connected to the fluid supply line and to the power takeoff;
augmenting the supply of fluid in the fluid supply line to the power takeoff with the fluid retained in the hydraulic accumulator; and
maintaining the pressure of the retained fluid above the pressure in the fluid supply line when the pressure in the fluid supply line is less than normal operating pressure for actuating the clutch piston.

31. The method of claim 30, comprising:
pressurizing a piston connected to a clutch in the power takeoff with fluid retained in the hydraulic accumulator; and
engaging the clutch by said pressurizing.

32. The method of claim 30, comprising:
pressurizing the accumulator with fluid from the fluid supply line.

33. The method of claim 30, comprising:
supplying fluid retained in the hydraulic accumulator to the power takeoff independent of the fluid pressure in the supply line.

34. The method of claim 30, comprising:
supplying fluid retained in the hydraulic accumulator to the surface of clutch plates in the power takeoff, the clutch plates being connected to an output shaft of the power takeoff.

35. The method of claim 34, wherein said supplying occurs while the clutch plates are being engaged with one another to actuate the output shaft.

36. The method of claim 34, wherein said supplying occurs when a temperature in the power takeoff exceeds a threshold.

37. The method of claim 30, comprising:
stabilizing the hydraulic pressure in the clutch piston with the fluid retained in the hydraulic accumulator.

38. The method of claim 30, comprising:
selectively connecting the supply line to a piston connected to a clutch in the power takeoff; and
selectively connecting the accumulator to the supply line or the clutch.

39. The method of claim 38, wherein said selectively connecting the accumulator connects the accumulator to a clutch piston when said selectively connecting the accumulator results in connecting the accumulator to the clutch.

40. The method of claim 38, wherein said selectively connecting the accumulator connects the accumulator to a location where fluid from the accumulator will reach the surface of clutch plates when said selectively connecting the accumulator results in connecting the accumulator to the clutch.

* * * * *